(12) United States Patent
Ravuri et al.

(10) Patent No.: US 12,420,707 B2
(45) Date of Patent: Sep. 23, 2025

(54) VEHICULAR CONTROL SYSTEM WITH CROSS TRAFFIC ALERT AND COLLISION AVOIDANCE

(71) Applicant: Magna Electronics Inc., Auburn Hills, MI (US)

(72) Inventors: Naresh Ravuri, Novi, MI (US); Jeremy J. Baca, Ann Arbor, MI (US); Suresh Boddi, New Hudson, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 182 days.

(21) Appl. No.: 18/339,410

(22) Filed: Jun. 22, 2023

(65) Prior Publication Data
US 2023/0415647 A1    Dec. 28, 2023

Related U.S. Application Data

(60) Provisional application No. 63/366,942, filed on Jun. 24, 2022.

(51) Int. Cl.
*B60Q 9/00*      (2006.01)
*B60Q 5/00*      (2006.01)
(Continued)

(52) U.S. Cl.
CPC .............. *B60Q 9/008* (2013.01); *B60Q 5/006* (2013.01); *B60R 1/22* (2022.01); *B60T 7/22* (2013.01);
(Continued)

(58) Field of Classification Search
CPC .......... B60Q 9/008; B60Q 5/006; B60R 1/22; B60R 2300/105; B60R 2300/70;
(Continued)

(56) References Cited

U.S. PATENT DOCUMENTS 5,550,677 A    8/1996  Schofield et al.
5,670,935 A    9/1997  Schofield et al.
(Continued)

FOREIGN PATENT DOCUMENTS

WO    WO-2010099416 A1 *  9/2010 ............. B60Q 9/005
WO    WO-2013109869 A1 *  7/2013 ............. B60R 11/04
(Continued)

*Primary Examiner* — Joseph J Dallo
(74) *Attorney, Agent, or Firm* — HONIGMAN LLP (57) ABSTRACT

A vehicular driving assist system includes a plurality of cameras and a plurality of sensors disposed at a vehicle. The plurality of sensors includes at least one selected from the group consisting of a plurality of radar sensors and a plurality of lidar sensors. Electronic circuitry of an electronic control unit includes an image processor for processing image data captured by the cameras and a processor for processing sensor data captured by the sensors. The system, while the vehicle is travelling in a forward direction and responsive to processing of image data captured by the cameras and sensor data captured by the sensors, is operable to determine presence of an object approaching a path of travel of the vehicle. The system, responsive to determining presence of the object approaching the path of travel of the vehicle, communicates an alert to a driver of the vehicle.

35 Claims, 7 Drawing Sheets

(51) Int. Cl.
*B60R 1/22* (2022.01)
*B60T 7/22* (2006.01)
*G08G 1/16* (2006.01)

(52) U.S. Cl.
CPC ........ *G08G 1/166* (2013.01); *B60R 2300/105* (2013.01); *B60R 2300/70* (2013.01); *B60T 2201/022* (2013.01); *B60T 2210/32* (2013.01); *B60T 2220/00* (2013.01); *B60T 2250/00* (2013.01); *B60T 2250/04* (2013.01); *B60W 2420/403* (2013.01); *B60W 2420/408* (2024.01)

(58) Field of Classification Search
CPC .. B60T 7/22; B60T 2201/022; B60T 2210/32; B60T 2220/00; B60T 2250/00; B60T 2250/04; G08G 1/166; B60W 2420/403; B60W 2420/408
See application file for complete search history.

(56) References Cited

U.S. PATENT DOCUMENTS

| | | |
|---|---|---|
| 5,949,331 A | 9/1999 | Schofield et al. |
| 6,587,186 B2 | 7/2003 | Bamji et al. |
| 6,674,895 B2 | 1/2004 | Rafii et al. |
| 6,678,039 B2 | 1/2004 | Charbon |
| 6,690,354 B2 | 2/2004 | Sze |
| 6,710,770 B2 | 3/2004 | Tomasi et al. |
| 6,876,775 B2 | 4/2005 | Torunoglu |
| 6,906,793 B2 | 6/2005 | Bamji et al. |
| 6,919,549 B2 | 7/2005 | Bamji et al. |
| 7,038,577 B2 | 5/2006 | Pawlicki et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,720,580 B2 | 5/2010 | Higgins-Luthman |
| 7,855,755 B2 | 12/2010 | Weller et al. |
| 8,013,780 B2 | 9/2011 | Lynam |
| 8,027,029 B2 | 9/2011 | Lu et al. |
| 9,036,026 B2 | 5/2015 | Dellantoni et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 9,869,762 B1 | 1/2018 | Alland et al. |
| 9,954,955 B2 | 4/2018 | Davis et al. |
| 10,866,306 B2 | 12/2020 | Maher et al. |
| 2013/0116859 A1* | 5/2013 | Ihlenburg ............... B60W 10/18 701/1 |
| 2016/0288699 A1* | 10/2016 | Solar ..................... G08G 1/163 |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0065623 A1* | 3/2018 | Wodrich ............... B60W 30/06 |
| 2018/0231635 A1 | 8/2018 | Woehlte |
| 2019/0248347 A1* | 8/2019 | Kim .................. B60W 30/0956 |
| 2019/0291725 A1* | 9/2019 | Yokoi .................... G06V 20/58 |
| 2019/0339382 A1 | 11/2019 | Hess et al. |
| 2020/0031337 A1* | 1/2020 | Soltanian ............. G05D 1/0248 |
| 2020/0391728 A1* | 12/2020 | Okumura .............. B60W 30/08 |
| 2021/0155167 A1* | 5/2021 | Lynam ................. B62D 15/028 |
| 2022/0005210 A1* | 1/2022 | Raveendran ........... B60R 25/31 |
| 2022/0227366 A1* | 7/2022 | Shah .................... B60W 50/14 |
| 2023/0032998 A1 | 2/2023 | Kushwaha et al. |
| 2023/0044279 A1* | 2/2023 | Lu .......................... G01S 17/86 |
| 2023/0140089 A1* | 5/2023 | Lynam .................... G02F 1/153 359/265 |
| 2023/0174096 A1* | 6/2023 | Kuntschar ........... B60W 60/001 701/23 |
| 2023/0415647 A1* | 12/2023 | Ravuri ..................... B60T 7/22 |
| 2023/0415734 A1* | 12/2023 | Zhu ........................ G01S 13/867 |

FOREIGN PATENT DOCUMENTS

| | | | |
|---|---|---|---|
| WO | WO-2016115053 A1 * | 7/2016 | ............. A61B 3/112 |
| WO | WO-2022150196 A1 * | 7/2022 | ............ B60R 16/023 |

\* cited by examiner

FIG. 7

VEHICULAR CONTROL SYSTEM WITH CROSS TRAFFIC ALERT AND COLLISION AVOIDANCE

CROSS REFERENCE TO RELATED APPLICATION

The present application claims the filing benefits of U.S. provisional application Ser. No. 63/366,942, filed Jun. 24, 2022, which is hereby incorporated herein by reference in its entirety.

FIELD OF THE INVENTION

The present invention relates generally to a vehicular sensing system for a vehicle and, more particularly, to a vehicular sensing system that utilizes multiple sensors at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A driving assistance system or vision system or imaging system or sensing system for a vehicle utilizes one or more cameras (preferably one or more CMOS cameras) to capture image data representative of images exterior of the vehicle and one or more sensors (such as ultrasonic sensors or radar sensors) to capture sensor data exterior of the vehicle, and provides a forward cross-traffic alert to a driver of the vehicle when, based on processing of the captured image data and/or processing of the captured sensor data, the system determines presence of an object approaching a path of travel of the vehicle. Based at least in part on a driving environment at the vehicle, and when operating to determine presence of the object approaching the path of travel of the vehicle, the system adjusts weighting of processing of the image data captured by the cameras and processing of sensor data captured by the sensors.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images or sensor data exterior of the vehicle and may process the captured image data or sensor data to display images and to detect objects at or near the vehicle and in the predicted path of the vehicle, such as to assist a driver of the vehicle in maneuvering the vehicle in a rearward or forward direction when the driver's view rearward or forward of the vehicle is at least partially obstructed by obstacles in the environment. The vision system includes a processor or image processor or image processing system that is operable to receive image data or sensor data from one or more cameras or sensors. Optionally, the system may provide an output to a display device for displaying images representative of the captured image data. Optionally, the vision system may provide display, such as a rearview display or a top down or bird's eye or surround view display or the like.

Figure 1:
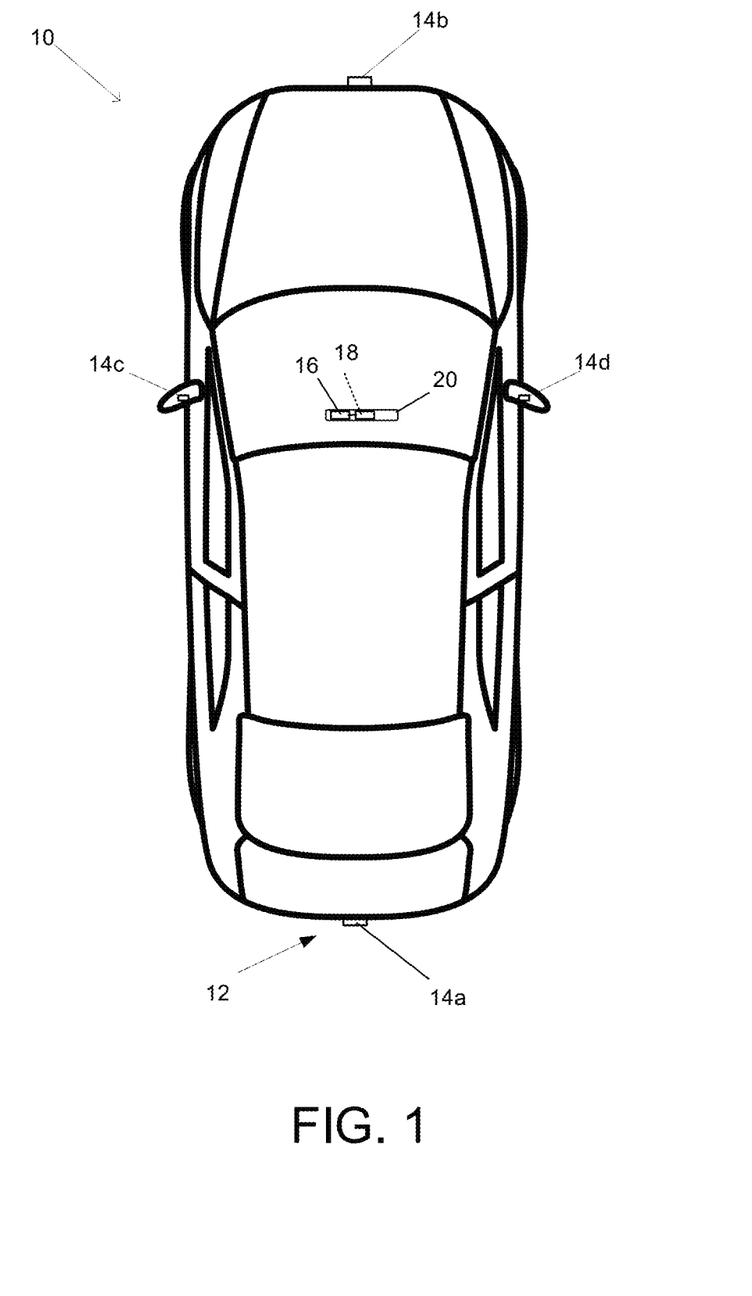
FIG. 1 is a plan view of a vehicle with a sensing system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor and/or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

When driving the vehicle in a forward direction, the driver may rely on his or her field of view through the windshield and/or windows of the vehicle to determine if hazards (such as obstacles or approaching traffic) are present in the environment. When a vehicle is being at least partially controlled or driven by an advanced driver assistance system (ADAS), such as adaptive cruise control, lane centering systems, automatic parking and unparking systems, and the like, these systems typically rely on sensor data captured by a windshield mounted camera or sensor having a similar field of view through the windshield as the driver of the vehicle.

Figure 2:
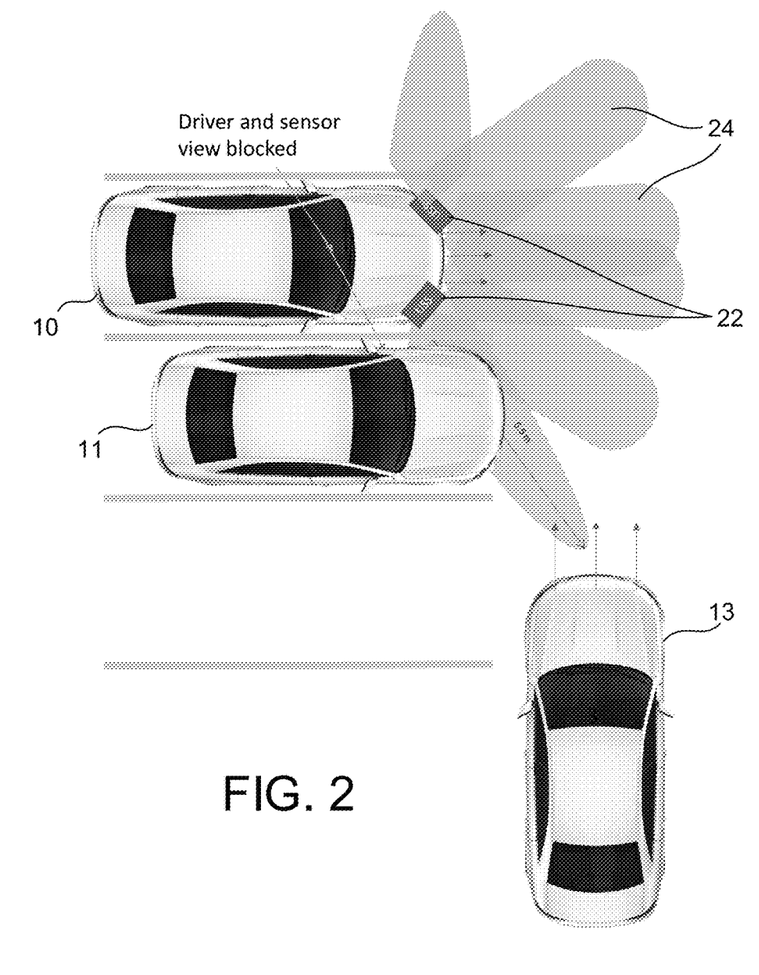
FIGS. 2 and 3 are plan views of the vehicle in a parking lot where the system uses sensor data captured by ultrasonic sensors to determine presence of an approaching vehicle in a blind spot of the driver.

As shown in FIG. 2, the driver's field of view and/or the field of view of a windshield mounted camera or sensor may be at least partially obstructed or blocked in certain forward driving situations where an obstacle is present immediately adjacent and/or at least partially forward of the equipped vehicle. For example, the field of view of the driver and/or the windshield mounted sensor of the equipped vehicle 10 may be blind spotted or obstructed for oncoming traffic vehicles 13 when the equipped vehicle is pulling forward out of a parking spot and an obstructing vehicle 11 is parked in the parking spot adjacent the equipped vehicle. In other words, the obstructing vehicle 11 creates a blind spot for the driver and/or windshield mounted sensor of the equipped vehicle, preventing or limiting the driver and/or sensor's view of approaching vehicles 13 travelling toward the path of travel of the equipped vehicle, such as in close proximity at a wide angle relative to the equipped vehicle 10.

Thus, the vehicular sensing system or driving assistance system 12 may provide a forward sensing cross-traffic alert system that, when the vehicle is travelling in a forward direction, senses approaching objects approaching the vehicle or a path of travel of the vehicle, such as in close proximity or approaching and at a wide angle relative to the forward direction of the vehicle (e.g., perpendicular to the forward direction of the vehicle). The driver of the vehicle may be alerted as to the presence of the approaching object and/or the driving assistance system 12 may apply a corrective driving maneuver (e.g., applying the brakes of the vehicle) to avoid collision with the approaching object. The forward sensing cross-traffic alert system may use ultrasonic sensors, forward viewing cameras (such as a windshield mounted camera or forward viewing cameras mounted at the front of the vehicle, such as at the front bumper or grill fascia), and/or radar sensors to sense the approaching objects.

Figure 3:
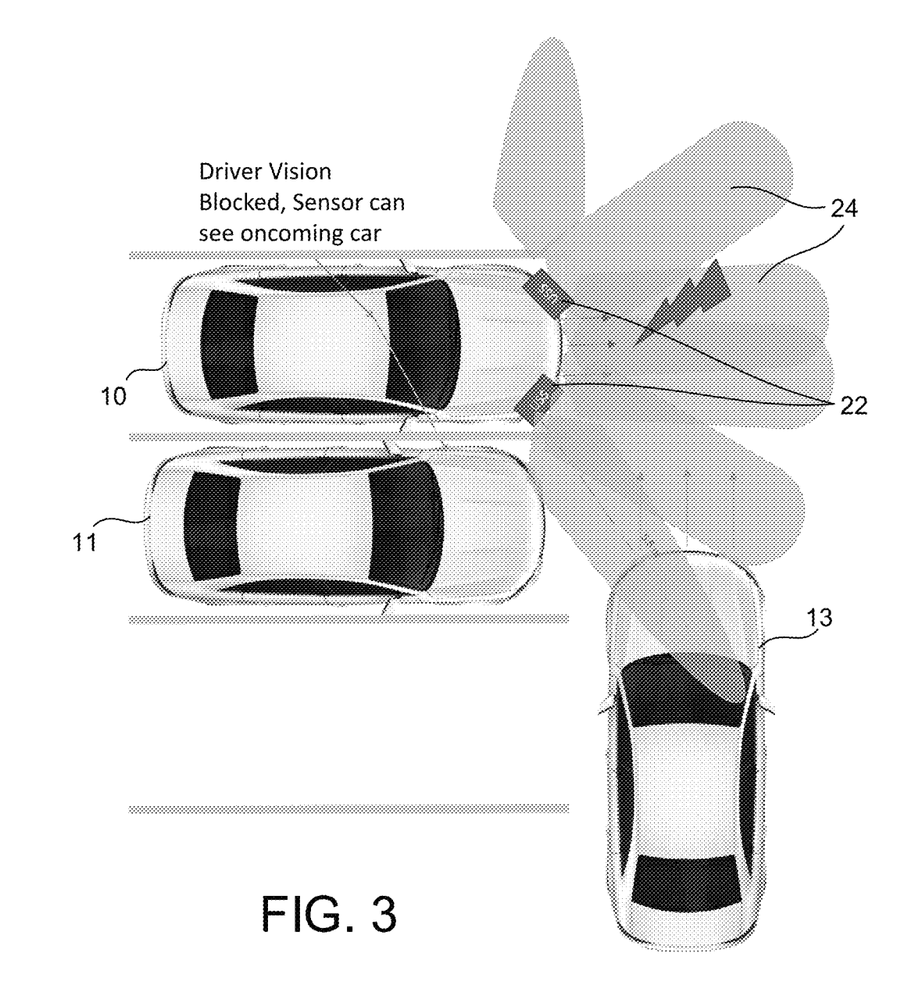

Referring to FIGS. 2 and 3, the vehicle 10 may include one or more ultrasonic sensors 22 disposed at a forward portion of the vehicle, such as at the front bumper or grill fascia of the vehicle. Each ultrasonic sensor 22 may have a corresponding field of sensing 24 emanating from the vehicle, such as at least forward and sideward of the vehicle. Fields of sensing 24 of the plurality of ultrasonic sensors 22 may combine to provide a 180 degree (or 360 degree) or more field of sensing for the system 12. Via processing of sensor data captured by the ultrasonic sensors 22, the system 12 may detect objects at or near the equipped vehicle, such as traffic approaching from either side of the vehicle when the vehicle is travelling in the forward direction. Even if one or more of the fields of sensing 24 of the ultrasonic sensors 22 are initially blocked when the equipped vehicle 10 begins moving forward, the ultrasonic sensors 22 will be able to sense approaching objects 13 sooner than the field of view of the driver becomes unobstructed. In other words, because the ultrasonic sensors 22 are positioned further toward the front of the vehicle than the driver's viewing position within the vehicle, objects and other vehicles may enter the field of sensing of the ultrasonic sensors 22 before the objects and other vehicles are viewable by the driver.

Figure 4:
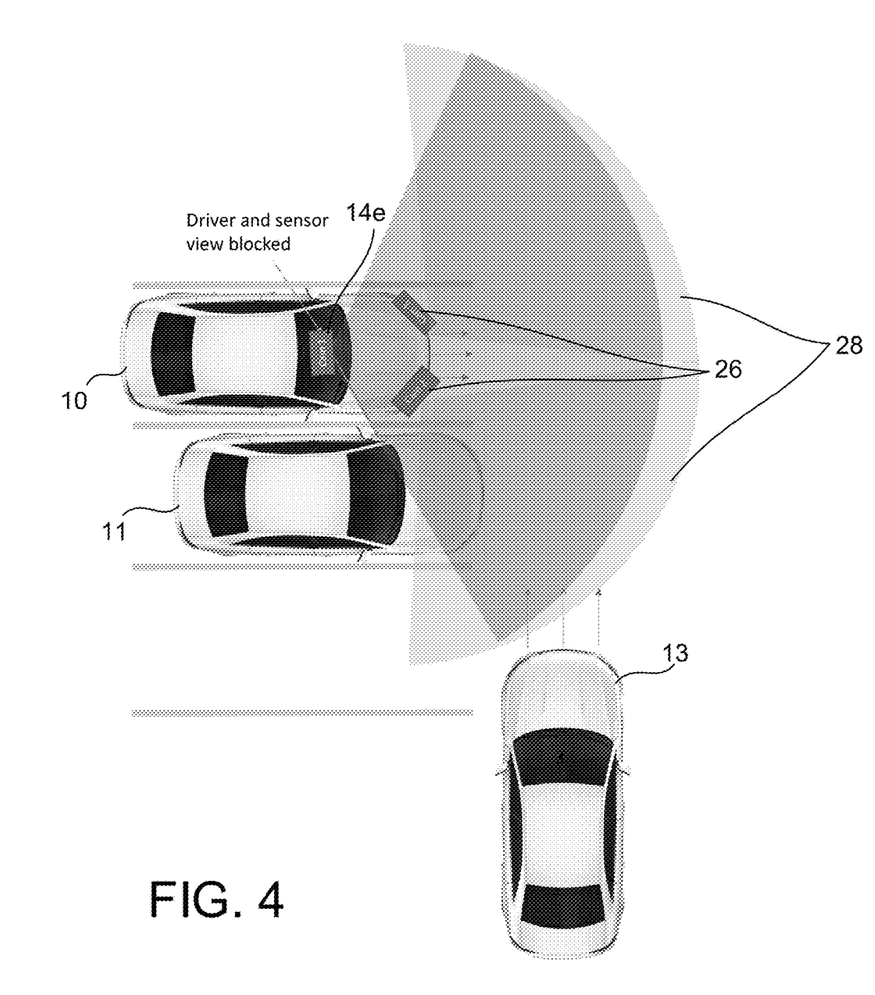
FIGS. 4 and 5 are plan views of the vehicle in the parking lot where the system uses sensor data captured by forward viewing cameras or lidar sensors to determine presence of the approaching vehicle in the blind spot of the driver.
Figure 5:
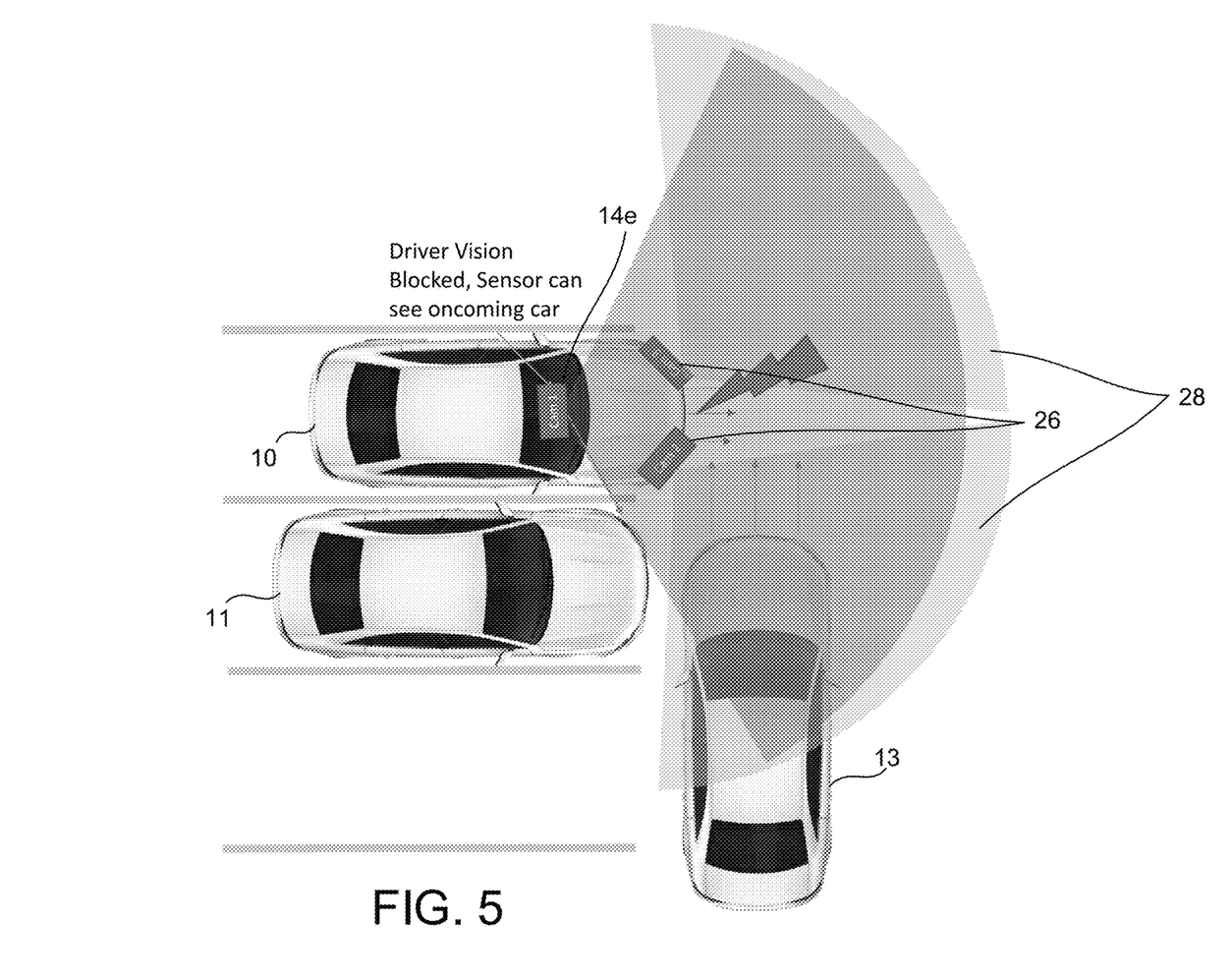

Referring to FIGS. 4 and 5, the vehicle 10, in addition to a windshield mounted camera 14e mounted at the inner surface of the windshield and viewing through the windshield and forward of the vehicle, may include one or more forward viewing cameras or lidar sensors 26 disposed at the front of the vehicle (such as at the front bumper or grill fascia) and having respective fields of view 28 originating at a more forward position of the vehicle than the windshield mounted camera 14e. Fields of view 28 of the forward viewing cameras or lidar sensors 26 may extend at least forward and sideward from the front portion of the vehicle. The forward viewing cameras 26 may be part of a surround view monitoring system (SVS) of the vehicle that processes image data captured by one or more cameras at the vehicle to provide a 360 degree or surround view or bird's eye view or top down view of the vehicle. Similar to the ultrasonic sensors 22, the forward viewing cameras or lidar sensors 26 may detect objects or traffic approaching from either side of the vehicle sooner than the driver or the windshield mounted camera 14e may be able to detect the approaching objects. That is, because the forward viewing cameras or lidar sensors 26 are positioned further toward the front of the vehicle than the windshield mounted camera 14e and the driver's viewing position within the vehicle, objects and other vehicles may enter the field of view of the forward viewing cameras or lidar sensors 26 before the objects and other vehicles are viewable by the windshield mounted camera 14e or the driver. Thus, by processing the image data captured by the forward viewing cameras 26, the system may detect objects and other vehicles sooner than if the system were to only process image data captured by the windshield mounted camera 14e and thus the driver and/or system may more quickly react to potential collisions.

Figure 6:
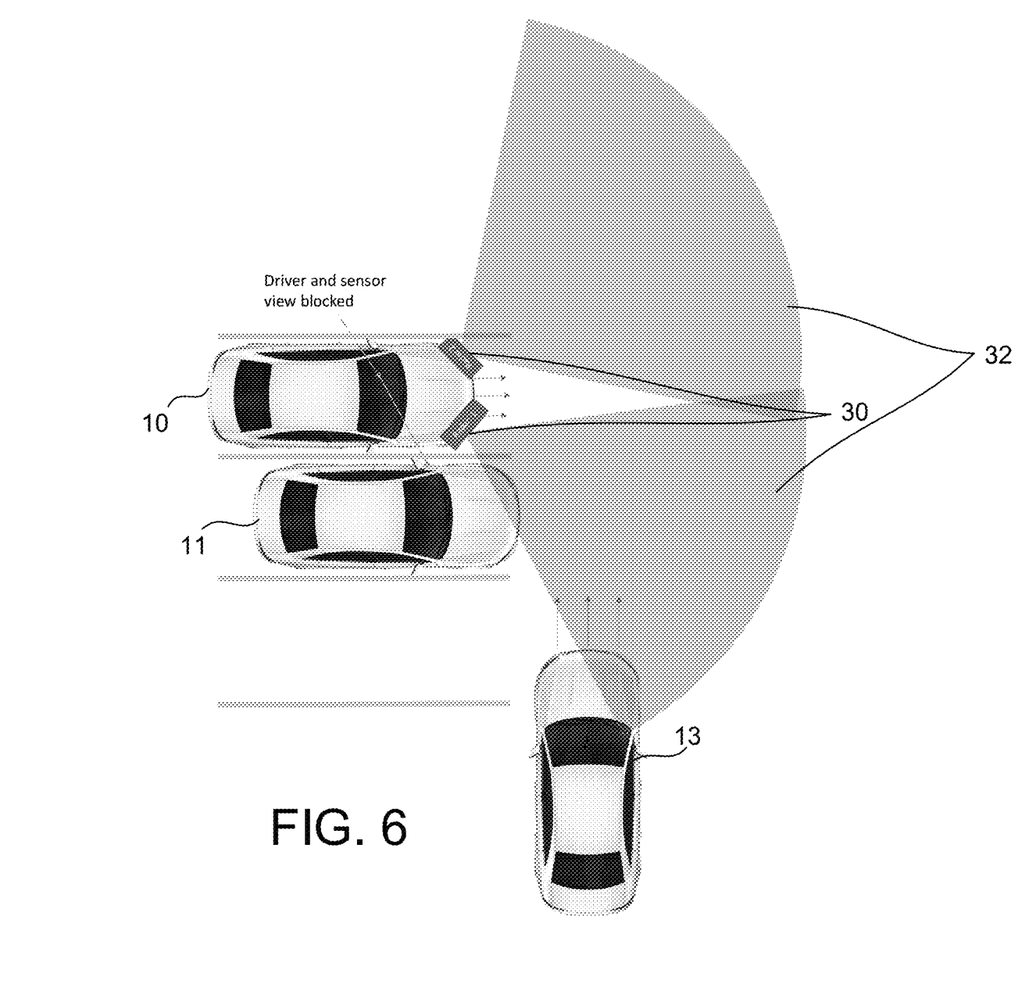
FIGS. 6 and 7 are plan views of the vehicle in the parking lot where the system uses sensor data captured by radar sensors to determine presence of the approaching vehicle in the blind spot of the driver.
Figure 7:
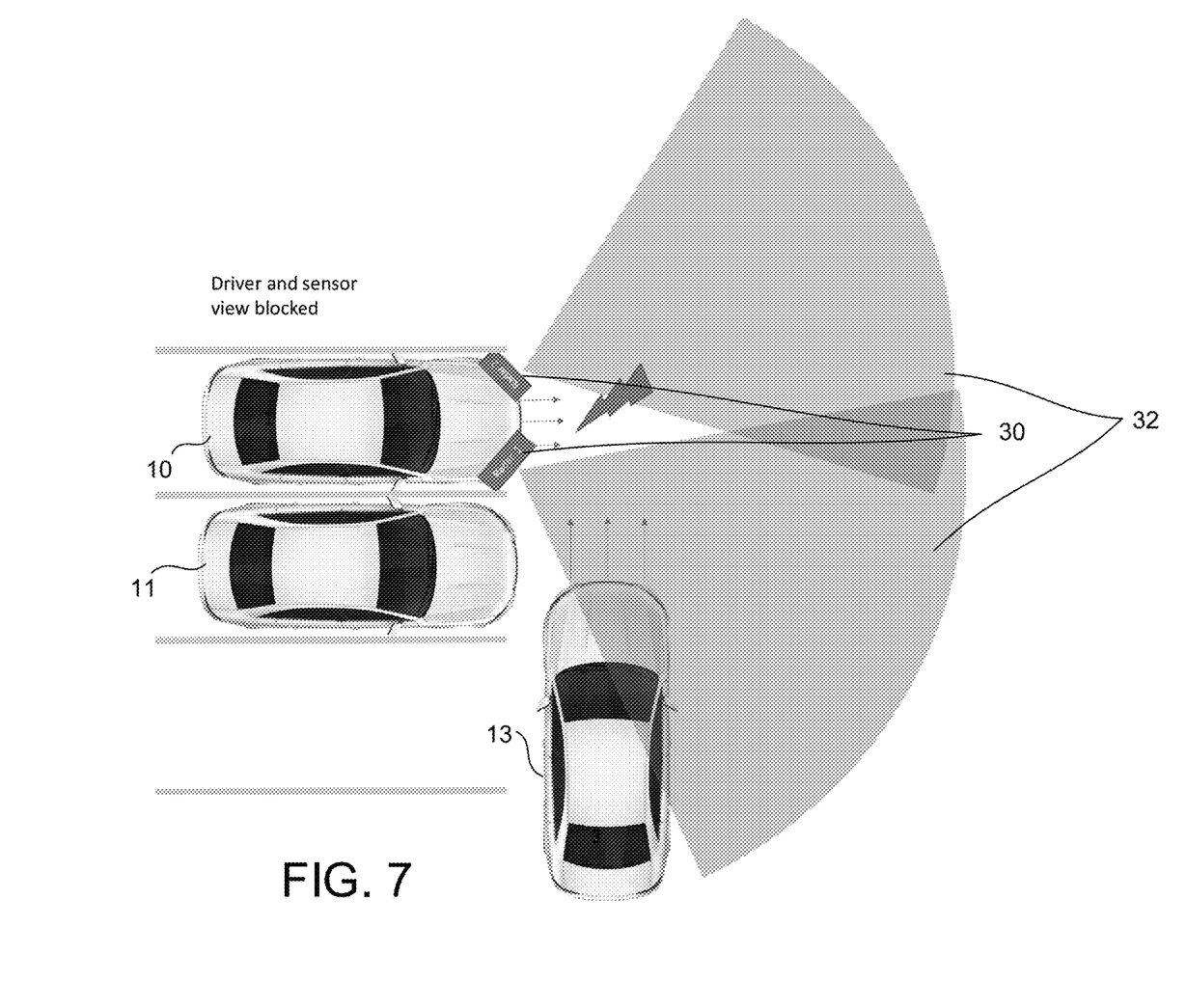

Referring to FIGS. 6 and 7, the vehicle 10 may also or otherwise include one or more radar sensors 30 disposed at a forward position of the vehicle, such as embedded into the headlamp or at the front bumper or grill fascia. Each radar sensor 30 may have a corresponding field of sensing 32, such as at least forward and sideward of the vehicle, and the combined field of sensing of the radar sensors 30 allows the system 12 to detect objects approaching from either side of the vehicle 10. Similar to the ultrasonic sensors 22 and the forward viewing cameras or lidar sensors 26, the radar sensors 30 may detect approaching objects before the driver or windshield mounted camera 14e is able to detect the approaching object. That is, sensor data captured by the radar sensors 30 is processed by the system to detect presence of objects or other vehicles that may not be detectable by the windshield mounted camera 14e or the driver of the vehicle.

Responsive to determining presence of an approaching object via processing of sensor data captured by one or more of the ultrasonic sensors 22, windshield-mounted camera 14e, forward viewing cameras or lidar sensors 26, or the radar sensors 30, the system 12 may alert the driver as to the approaching object and/or perform a corrective driving maneuver to avoid or reduce risk of collision with the approaching object (e.g., applying automatic braking). For example, the system 12 may provide an audible tone and/or illuminate an indicator light at the interior portion of the vehicle. The alert may correspond to a direction of the approaching vehicle, such as illuminating an indicator light (e.g., a blind spot indicator at an exterior rearview mirror) at a side of the vehicle corresponding to the approaching vehicle or playing the audible tone out of a speaker corresponding to the approaching vehicle. Thus, if the other vehicle is approaching a passenger side of the equipped vehicle, the system may illuminate the indicator light at the passenger side and/or play the audio tone out of a speaker at the passenger side of the vehicle. This directs the driver's attention toward the side of the vehicle at which the other vehicle is approaching to prompt corrective action.

Optionally, the system may activate the display to provide forward cross-traffic images derived from the image data captured by the forward viewing cameras and including the approaching object. For example, the system may display wide angle video images (e.g., 180 degrees or more) to show the approaching vehicle as it approaches and crosses the path of travel of the equipped vehicle. The system may generate a graphic overlay at the displayed video images, such as to highlight the approaching vehicle or direct the driver's attention toward the display and the view of the approaching vehicle. Optionally, the system may display video images generated from image data captured by only the cameras currently viewing the approaching vehicle. For example, when the other vehicle is approaching the passenger side of the equipped vehicle, the system may display video images captured by the passenger side camera and, as the vehicle moves across the path of travel of the vehicle and away from the driver side of the vehicle, the system may display video images captured by the driver side camera.

The system may perform a driving maneuver responsive to determining presence of the approaching object, such as applying the brakes of the vehicle. That is, responsive to determining that a detected object or other vehicle is at or near or approaching the path of travel of the equipped vehicle as the equipped vehicle is travelling along the path of travel, the system controls operation of the vehicle to avoid or reduce chances of collision with the approaching vehicle. The system may control the braking system, steering system and/or powertrain of the vehicle to steer the vehicle, accelerate and/or decelerate the vehicle as necessary.

Optionally, in response to detecting the approaching vehicle, the system may determine a risk of collision associated with the approaching vehicle. That is, the system determines a likelihood of collision between the approaching vehicle and the equipped vehicle, and/or the system determines a time to collision (TTC) between the approaching vehicle and the equipped vehicle. The system may only perform the driving maneuver (e.g., apply the brakes) if a determined risk of collision with the approaching object is above a threshold risk. The system may determine the TTC or other qualities of the approaching vehicle utilizing characteristics of the systems described in U.S. Publication No. US-2023-0032998, which is hereby incorporated herein by reference in its entirety.

In some examples, the system may also provide increasing levels of alerts and only perform the driving maneuver after providing lower levels of alert. For example, the system may initially provide the audible tone when presence of the approaching object is detected and risk of collision is low, then activate the display to provide the forward cross-traffic images if risk of collision increases, and then activate the brakes of the vehicle if risk of collision increases and surpasses the threshold risk.

Certain driving or environmental conditions may allow for one set of sensors to determine presence of approaching vehicles better than another set of sensors. For example, the forward viewing cameras 26 may become occluded, such as due to rain, dirt, bugs, or other debris or weather conditions, and the ultrasonic sensors 22 or radar sensors 30 may be able to better sense the approaching objects. Thus, the system may, simultaneously or within the same time interval or at the same time instance, capture sensor data using multiple sensors or sets of sensors to determine presence of approaching objects. For example, the system may process image data captured by the forward viewing cameras 26 and sensor data captured by one or more of the ultrasonic sensors 22 and the radar sensors 30 (at or near the same time instance) to determine presence of approaching objects.

Optionally, if sensor data captured by one sensor or set of sensors is determined to be unreliable (such as if image data captured by the forward viewing cameras 26 is determined to have occlusions), the system 12 may begin processing sensor data from another sensor or set of sensors or may provide greater weight to or reliance on processing of sensor data from another sensor or set of sensors. That is, determining whether an object or vehicle is approaching the path of travel of the equipped vehicle may include weighting the sensor data captured by the forward viewing cameras 26, the radar sensors 30, and the ultrasonic sensors 22 (e.g., applying higher weight or lower weight to sensor data captured by one or more of the sensors).

Further, the weighting of the respective sensor data and/or image data may be adjusted based on environmental conditions or driving environment at the vehicle and/or a determined condition or driving condition of the vehicle. For example, during rainy or snowy or cold weather conditions (environmental conditions), the system may determine that the captured image data is likely to be unreliable and/or that visibility at the vehicle may be poor or compromised (due to likelihood of rain, snow and/or ice at least partially blocking the view of the camera) and may process (or apply greater weight to processing of) sensor data from the ultrasonic sensors 22 and/or radar sensors 30 to determine presence of objects or other vehicles. Thus, if the system determines that the environmental or weather conditions are rainy or snowy or cold (such as based on a rain sensor at the vehicle, a thermometer at the vehicle, or based on weather information or forecasts from a remote server in wireless communication with the system), the system may switch to reliance or greater reliance on the other sensors.

Further, the environmental condition may be determined based on a user input. For example, the vehicle may include a drive mode selector within the vehicle cabin for the driver to select a drive mode of the vehicle (e.g., a normal drive mode, a sport drive mode, an eco-drive mode, a mountain drive mode, a slippery drive mode and the like) and based on the user selection of one or more of the drive modes (e.g., the slippery drive mode), the system may adjust processing and/or weighting of the radar sensor data, ultrasonic sensor data and image data. Because the driver may select the slippery drive mode based on poor environmental conditions (e.g., snow or rain), the system may apply greater weight to radar sensor data and/or ultrasonic sensor data and the system may apply reduced weight to image data.

Optionally, the system may initially detect presence of an approaching object via processing of one of the captured image data or captured sensor data and confirm presence of the approaching object via processing of another of the captured image data or captured sensor data. For example, the system may detect presence of an approaching object based on sensor data captured by the ultrasonic sensors 22 and confirm that the object is a vehicle approaching the path of travel of the equipped vehicle based on image data captured by the forward viewing cameras 26.

Optionally, the system may be activated (i.e., begin processing captured sensor data to determine presence of approaching objects) responsive to a determined driving condition of the vehicle, such as based on a selected gear of the vehicle or a geographic location of the vehicle. That is, system may be activated responsive to a gear selector of the vehicle shifting from park to a forward driving gear, or responsive to determination that the vehicle is located in a parking lot or driveway or intersection or location known to have an obstructed view (such as a street corner with hedges or trees blocking the driver's view of the intersection). For example, the system may determine that the equipped vehicle is approaching an intersection with a pedestrian crosswalk and the system may begin processing captured sensor data to monitor for presence of pedestrians in the crosswalk or at the street corner that might be obstructed from the view of the driver and/or the windshield mounted camera.

Optionally, the system may determine a blind spot of the driver and/or windshield mounted sensor (such as by determining that an obstructing object is in close proximity to the vehicle) and, in response to the determined blind spot, process sensor data to determine presence of objects in the blind spot. For example, a blind spot may be determined for the windshield mounted sensor and, in response, the system may process sensor data captured by radar sensors at the front bumpers of the vehicle to determine whether objects are present in the determined blind spot.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

The system may utilize sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in U.S. Pat. Nos. 10,071,687; 9,900,522; 9,834,153; 9,762,880; 9,596,387; 9,264,672; 9,126,525 and/or 9,041,806, and/or U.S. Publication No. US-2015-0022664, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assist system, the vehicular driving assist system comprising:
   a plurality of cameras disposed at a vehicle equipped with the vehicular driving assist system and viewing exterior of the vehicle, the cameras capturing image data;
   wherein each camera of the plurality of cameras comprises a CMOS imaging array, having at least one million photosensors arranged in rows and columns;
   a plurality of sensors disposed at the vehicle, the plurality of sensors capturing sensor data;
   wherein the plurality of sensors comprises at least one selected from the group consisting of (i) a plurality of radar sensors and (ii) a plurality of lidar sensors;
   wherein the plurality of sensors includes at least (i) a driver-side sensor that senses at least forward and sideward of the vehicle and (ii) a passenger-side sensor that senses at least forward and sideward of the vehicle;
   an electronic control unit (ECU) comprising electronic circuitry and associated software;
   wherein the electronic circuitry of the ECU comprises at least one data processor for processing image data captured by the plurality of cameras and for processing sensor data captured by the plurality of sensors;
   wherein the vehicular driving assist system, while the vehicle is travelling in a forward direction along a path of travel and responsive to processing at the ECU of image data captured by the plurality of cameras and sensor data captured by the plurality of sensors, is operable to determine presence of an object approaching the path of travel of the vehicle;
   wherein the vehicular driving assist system, based at least in part on a driving environment at the vehicle, and when operating to determine presence of the object approaching the path of travel of the vehicle, adjusts (i) processing at the ECU of the image data captured by the plurality of cameras and (ii) processing at the ECU of the sensor data captured by the plurality of sensors;
   wherein the vehicular driving assist system, responsive to determining presence of the object approaching the path of travel of the vehicle, alerts a driver of the vehicle;
   wherein the driving environment is determined by the vehicular driving assist system; and
   wherein the vehicular driving assist system, responsive to the driving environment at the vehicle corresponding to an environment in which sensor data captured by the plurality of sensors is compromised, increases reliance on processing at the ECU of the image data captured by the plurality of cameras and decreases reliance on of processing at the ECU of the sensor data captured by the plurality of sensors.

2. The vehicular driving assist system of claim 1, wherein the plurality of sensors comprises the plurality of radar sensors.

3. The vehicular driving assist system of claim 1, wherein the plurality of sensors comprises the plurality of lidar sensors.

4. The vehicular driving assist system of claim 1, wherein the plurality of sensors comprises (i) the plurality of radar sensors and (ii) the plurality of lidar sensors.

5. The vehicular driving assist system of claim 1, wherein the vehicular driving assist system, based at least in part on a driving condition at the vehicle, begins processing image data captured by the plurality of cameras and sensor data captured by the plurality of sensors.

6. The vehicular driving assist system of claim 5, wherein the driving condition is determined by the vehicular driving assist system.

7. The vehicular driving assist system of claim 6, wherein the driving condition comprises determination that the vehicle is travelling in the forward direction and below a threshold speed.

8. The vehicular driving assist system of claim 6, wherein the driving condition comprises determination that a geographic location of the vehicle corresponds to one selected from the group consisting of (i) a parking lot, (ii) an intersection and (iii) a driveway.

9. The vehicular driving assist system of claim 1, wherein the vehicular driving assist system alerts the driver via an audible tone.

10. The vehicular driving assist system of claim 1, wherein the vehicular driving assist system alerts the driver via illumination of an indicator light at an interior portion of the vehicle.

11. The vehicular driving assist system of claim 1, wherein the vehicular driving assist system alerts the driver via display of forward cross-traffic video images at a display at an interior portion of the vehicle, and wherein the forward cross-traffic video images are derived from the image data captured by at least one camera of the plurality of cameras.

12. The vehicular driving assist system of claim 1, wherein the vehicular driving assist system, responsive to determining presence of the object and responsive to determination that a risk of collision between the vehicle and the object is greater than a threshold risk, controls braking of the vehicle to reduce speed of the vehicle in the forward direction.

13. The vehicular driving assist system of claim 12, wherein the vehicular driving assist system controls braking of the vehicle to stop the vehicle.

14. A vehicular driving assist system, the vehicular driving assist system comprising:
   a plurality of cameras disposed at a vehicle equipped with the vehicular driving assist system and viewing exterior of the vehicle, the cameras capturing image data;
   wherein each camera of the plurality of cameras comprises a CMOS imaging array, having at least one million photosensors arranged in rows and columns;
   a plurality of sensors disposed at the vehicle, the plurality of sensors capturing sensor data;
   wherein the plurality of sensors comprises at least one selected from the group consisting of (i) a plurality of radar sensors and (ii) a plurality of lidar sensors;
   wherein the plurality of sensors includes at least (i) a driver-side sensor that senses at least forward and sideward of the vehicle and (ii) a passenger-side sensor that senses at least forward and sideward of the vehicle;

an electronic control unit (ECU) comprising electronic circuitry and associated software;

wherein the electronic circuitry of the ECU comprises at least one data processor for processing image data captured by the plurality of cameras and for processing sensor data captured by the plurality of sensors;

wherein the vehicular driving assist system, while the vehicle is travelling in a forward direction along a path of travel and responsive to processing at the ECU of image data captured by the plurality of cameras and sensor data captured by the plurality of sensors, is operable to determine presence of an object approaching the path of travel of the vehicle;

wherein the vehicular driving assist system, based at least in part on a driving environment at the vehicle, and when operating to determine presence of the object approaching the path of travel of the vehicle, adjusts (i) processing at the ECU of the image data captured by the plurality of cameras and (ii) processing at the ECU of the sensor data captured by the plurality of sensors;

wherein the vehicular driving assist system, responsive to determining presence of the object approaching the path of travel of the vehicle, alerts a driver of the vehicle;

wherein the driving environment is determined by the vehicular driving assist system; and wherein the vehicular driving assist system, responsive to the driving environment at the vehicle being indicative of visibility at the vehicle being compromised, reduces reliance on processing at the ECU of the image data captured by the plurality of cameras and increases reliance on processing at the ECU of the sensor data captured by the plurality of sensors.

15. The vehicular driving assist system of claim 14, wherein the determined driving environment at the vehicle is determined to be indicative of visibility at the vehicle being compromised based on determination that the image data captured by the plurality of cameras is compromised.

16. The vehicular driving assist system of claim 1, wherein the vehicular driving assist system determines the driving environment at the vehicle based on a signal received by the vehicular driving assist system, and wherein the signal received by the vehicular driving assist system is representative of an environmental condition at the vehicle.

17. The vehicular driving assist system of claim 16, wherein the signal representative of the environmental condition at the vehicle is communicated to the vehicular driving assist system by a rain sensor of the vehicle.

18. The vehicular driving assist system of claim 16, wherein the signal representative of the environmental condition at the vehicle comprises a weather forecast wirelessly communicated to the vehicular driving assist system from a remote server.

19. The vehicular driving assist system of claim 1, the vehicular driving assist system determines the driving environment at the vehicle based on a user input.

20. The vehicular driving assist system of claim 19, wherein the user input comprises selection of a drive mode of the vehicle.

21. A vehicular driving assist system, the vehicular driving assist system comprising:

a plurality of cameras disposed at a vehicle equipped with the vehicular driving assist system and viewing exterior of the equipped vehicle, the cameras capturing image data;

wherein each camera of the plurality of cameras comprises a CMOS imaging array, having at least one million photosensors arranged in rows and columns;

a plurality of sensors disposed at the equipped vehicle, the plurality of sensors capturing sensor data;

wherein the plurality of sensors comprises at least one selected from the group consisting of (i) a plurality of radar sensors and (ii) a plurality of lidar sensors;

wherein the plurality of sensors includes at least (i) a driver-side sensor that senses at least forward and sideward of the equipped vehicle and (ii) a passenger-side sensor that senses at least forward and sideward of the equipped vehicle;

an electronic control unit (ECU) comprising electronic circuitry and associated software;

wherein the electronic circuitry of the ECU comprises at least one data processor for processing image data captured by the plurality of cameras and for processing sensor data captured by the plurality of sensors;

wherein the vehicular driving assist system, based at least in part on a driving condition at the equipped vehicle, begins processing image data captured by the plurality of cameras and sensor data captured by the plurality of sensors;

wherein the driving condition comprises determination that the equipped vehicle is travelling in the forward direction and below a threshold speed;

wherein the vehicular driving assist system, while the equipped vehicle is travelling in a forward direction along a path of travel and responsive to processing at the ECU of image data captured by the plurality of cameras and sensor data captured by the plurality of sensors, is operable to determine presence of another vehicle approaching the path of travel of the equipped vehicle;

wherein the vehicular driving assist system, based at least in part on a driving environment at the equipped vehicle, and when operating to determine presence of the other vehicle approaching the path of travel of the equipped vehicle, adjusts (i) processing at the ECU of the image data captured by the plurality of cameras and (ii) processing at the ECU of the sensor data captured by the plurality of sensors;

wherein the vehicular driving assist system, responsive to determining presence of the other vehicle approaching the path of travel of the equipped vehicle, alerts a driver of the equipped vehicle;

wherein the driving environment is determined by the vehicular driving assist system; and wherein the vehicular driving assist system, responsive to the driving environment at the equipped vehicle corresponding to an environment in which sensor data captured by the plurality of sensors is compromised, increases reliance on processing at the ECU of the image data captured by the plurality of cameras and decreases reliance on of processing at the ECU of the sensor data captured by the plurality of sensors.

22. The vehicular driving assist system of claim 21, wherein the plurality of sensors comprises (i) the plurality of radar sensors and (ii) the plurality of lidar sensors.

23. The vehicular driving assist system of claim 21, wherein the vehicular driving assist system alerts the driver via display of forward cross-traffic video images at a display at an interior portion of the equipped vehicle, and wherein the forward cross-traffic video images are derived from the image data captured by at least one camera of the plurality of cameras.

24. The vehicular driving assist system of claim 21, wherein the vehicular driving assist system, responsive to determining presence of the other vehicle and responsive to determination that a risk of collision between the equipped vehicle and the other vehicle is greater than a threshold risk, controls braking of the equipped vehicle to reduce speed of the equipped vehicle in the forward direction.

25. A vehicular driving assist system, the vehicular driving assist system comprising:
a plurality of cameras disposed at a vehicle equipped with the vehicular driving assist system and viewing exterior of the equipped vehicle, the cameras capturing image data;
wherein each camera of the plurality of cameras comprises a CMOS imaging array, having at least one million photosensors arranged in rows and columns;
a plurality of sensors disposed at the equipped vehicle, the plurality of sensors capturing sensor data;
wherein the plurality of sensors comprises at least one selected from the group consisting of (i) a plurality of radar sensors and (ii) a plurality of lidar sensors;
wherein the plurality of sensors includes at least (i) a driver-side sensor that senses at least forward and sideward of the equipped vehicle and (ii) a passenger-side sensor that senses at least forward and sideward of the equipped vehicle;
an electronic control unit (ECU) comprising electronic circuitry and associated software;
wherein the electronic circuitry of the ECU comprises at least one data processor for processing image data captured by the plurality of cameras and for processing sensor data captured by the plurality of sensors;
wherein the vehicular driving assist system, based at least in part on a driving condition at the equipped vehicle, begins processing image data captured by the plurality of cameras and sensor data captured by the plurality of sensors;
wherein the driving condition comprises determination that the equipped vehicle is travelling in the forward direction and below a threshold speed;
wherein the vehicular driving assist system, while the equipped vehicle is travelling in a forward direction along a path of travel and responsive to processing at the ECU of image data captured by the plurality of cameras and sensor data captured by the plurality of sensors, is operable to determine presence of another vehicle approaching the path of travel of the equipped vehicle;
wherein the vehicular driving assist system, based at least in part on a driving environment at the equipped vehicle, and when operating to determine presence of the other vehicle approaching the path of travel of the equipped vehicle, adjusts (i) processing at the ECU of the image data captured by the plurality of cameras and (ii) processing at the ECU of the sensor data captured by the plurality of sensors;
wherein the vehicular driving assist system, responsive to determining presence of the other vehicle approaching the path of travel of the equipped vehicle, alerts a driver of the equipped vehicle;
wherein the driving environment is determined by the vehicular driving assist system; and
wherein the vehicular driving assist system, responsive to the driving environment at the equipped vehicle being indicative of visibility at the vehicle being compromised, reduces reliance on processing at the ECU of the image data captured by the plurality of cameras and increases reliance on processing at the ECU of the sensor data captured by the plurality of sensors.

26. A vehicular driving assist system, the vehicular driving assist system comprising:
a plurality of cameras disposed at a vehicle equipped with the vehicular driving assist system and viewing exterior of the vehicle, the cameras capturing image data;
wherein each camera of the plurality of cameras comprises a CMOS imaging array, having at least one million photosensors arranged in rows and columns;
a plurality of sensors disposed at the vehicle, the plurality of sensors capturing sensor data;
wherein the plurality of sensors comprises at least one selected from the group consisting of (i) a plurality of radar sensors and (ii) a plurality of lidar sensors;
wherein the plurality of sensors includes at least (i) a driver-side sensor that senses at least forward and sideward of the vehicle and (ii) a passenger-side sensor that senses at least forward and sideward of the vehicle;
an electronic control unit (ECU) comprising electronic circuitry and associated software;
wherein the electronic circuitry of the ECU comprises at least one data processor for processing image data captured by the plurality of cameras and for processing sensor data captured by the plurality of sensors;
wherein the vehicular driving assist system, based at least in part on a driving condition at the vehicle, begins processing image data captured by the plurality of cameras and sensor data captured by the plurality of sensors;
wherein the driving condition comprises determination that a geographic location of the vehicle corresponds to one selected from the group consisting of (i) a parking lot, (ii) an intersection and (iii) a driveway;
wherein the vehicular driving assist system, while the vehicle is travelling in a forward direction along a path of travel and responsive to processing at the ECU of image data captured by the plurality of cameras and sensor data captured by the plurality of sensors, is operable to determine presence of a pedestrian approaching the path of travel of the vehicle;
wherein the vehicular driving assist system, based at least in part on a driving environment at the vehicle, and when operating to determine presence of the pedestrian approaching the path of travel of the vehicle, adjusts (i) processing at the ECU of the image data captured by the plurality of cameras and (ii) processing at the ECU of the sensor data captured by the plurality of sensors;
wherein the vehicular driving assist system, responsive to determining presence of the pedestrian approaching the path of travel of the vehicle, alerts a driver of the vehicle;
wherein the driving environment is determined by the vehicular driving assist system; and
wherein the vehicular driving assist system, responsive to the driving environment at the vehicle corresponding to an environment in which sensor data captured by the plurality of sensors is compromised, increases reliance on processing at the ECU of the image data captured by the plurality of cameras and decreases reliance on of processing at the ECU of the sensor data captured by the plurality of sensors.

27. The vehicular driving assist system of claim 26, wherein the plurality of sensors comprises (i) the plurality of radar sensors and (ii) the plurality of lidar sensors.

28. The vehicular driving assist system of claim 26, wherein the vehicular driving assist system alerts the driver via display of forward cross-traffic video images at a display at an interior portion of the vehicle, and wherein the forward cross-traffic video images are derived from the image data captured by at least one camera of the plurality of cameras.

29. The vehicular driving assist system of claim 26, wherein the vehicular driving assist system, responsive to determining presence of the pedestrian and responsive to determination that a risk of collision between the vehicle and the pedestrian is greater than a threshold risk, controls braking of the vehicle to reduce speed of the vehicle in the forward direction.

30. A vehicular driving assist system, the vehicular driving assist system comprising:
a plurality of cameras disposed at a vehicle equipped with the vehicular driving assist system and viewing exterior of the vehicle, the cameras capturing image data;
wherein each camera of the plurality of cameras comprises a CMOS imaging array, having at least one million photosensors arranged in rows and columns;
a plurality of sensors disposed at the vehicle, the plurality of sensors capturing sensor data;
wherein the plurality of sensors comprises at least one selected from the group consisting of (i) a plurality of radar sensors and (ii) a plurality of lidar sensors;
wherein the plurality of sensors includes at least (i) a driver-side sensor that senses at least forward and sideward of the vehicle and (ii) a passenger-side sensor that senses at least forward and sideward of the vehicle;
an electronic control unit (ECU) comprising electronic circuitry and associated software;
wherein the electronic circuitry of the ECU comprises at least one data processor for processing image data captured by the plurality of cameras and for processing sensor data captured by the plurality of sensors;
wherein the vehicular driving assist system, based at least in part on a driving condition at the vehicle, begins processing image data captured by the plurality of cameras and sensor data captured by the plurality of sensors;
wherein the driving condition comprises determination that a geographic location of the vehicle corresponds to one selected from the group consisting of (i) a parking lot, (ii) an intersection and (iii) a driveway;
wherein the vehicular driving assist system, while the vehicle is travelling in a forward direction along a path of travel and responsive to processing at the ECU of image data captured by the plurality of cameras and sensor data captured by the plurality of sensors, is operable to determine presence of a pedestrian approaching the path of travel of the vehicle;
wherein the vehicular driving assist system, based at least in part on a driving environment at the vehicle, and when operating to determine presence of the pedestrian approaching the path of travel of the vehicle, adjusts (i) processing at the ECU of the image data captured by the plurality of cameras and (ii) processing at the ECU of the sensor data captured by the plurality of sensors;
wherein the vehicular driving assist system, responsive to determining presence of the pedestrian approaching the path of travel of the vehicle, alerts a driver of the vehicle;
wherein the driving environment is determined by the vehicular driving assist system; and
wherein the vehicular driving assist system, responsive to the driving environment at the vehicle being indicative of visibility at the vehicle being compromised, reduces reliance on processing at the ECU of the image data captured by the plurality of cameras and increases reliance on processing at the ECU of the sensor data captured by the plurality of sensors.

31. The vehicular driving assist system of claim 14, wherein the vehicular driving assist system determines the driving environment at the vehicle based on a signal received by the vehicular driving assist system, and wherein the signal received by the vehicular driving assist system is representative of an environmental condition at the vehicle.

32. The vehicular driving assist system of claim 31, wherein the signal representative of the environmental condition at the vehicle is communicated to the vehicular driving assist system by a rain sensor of the vehicle.

33. The vehicular driving assist system of claim 31, wherein the signal representative of the environmental condition at the vehicle comprises a weather forecast wirelessly communicated to the vehicular driving assist system from a remote server.

34. The vehicular driving assist system of claim 14, the vehicular driving assist system determines the driving environment at the vehicle based on a user input.

35. The vehicular driving assist system of claim 34, wherein the user input comprises selection of a drive mode of the vehicle.

* * * * *

UNITED STATES PATENT AND TRADEMARK OFFICE
CERTIFICATE OF CORRECTION

PATENT NO. : 12,420,707 B2
APPLICATION NO. : 18/339410
DATED : September 23, 2025
INVENTOR(S) : Naresh Ravuri et al.

Page 1 of 1

It is certified that error appears in the above-identified patent and that said Letters Patent is hereby corrected as shown below:

In the Specification

Column 8
Lines 57-58, "5,668,663; 6,690,268;" should be --5,668,663; 5,724,187; 6,690,268;--
Lines 60-61, "5,802,727; 6,087,953;" should be --5,802,727; 5,878,370; 6,087,953;--

Signed and Sealed this
Twenty-first Day of October, 2025

John A. Squires
*Director of the United States Patent and Trademark Office*